United States Patent
Schmitt et al.

(10) Patent No.: US 6,750,847 B1
(45) Date of Patent: Jun. 15, 2004

(54) OPERATOR'S COMMUNICATION UNIT WITH A MOUSE FOR A COMPUTER

(75) Inventors: Heinz Schmitt, Dietzhölztal (DE); Reimund Lotz, Dillenburg (DE); Holger Walberdorf, Dietzhölztal (DE); Oskar Elm, Dietzhölztal (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 09/830,746

(22) PCT Filed: Oct. 9, 1999

(86) PCT No.: PCT/EP99/07585

§ 371 (c)(1),
(2), (4) Date: Jul. 27, 2001

(87) PCT Pub. No.: WO00/26854

PCT Pub. Date: May 11, 2000

(30) Foreign Application Priority Data

Oct. 30, 1998 (DE) .......................................... 198 50 305

(51) Int. Cl.⁷ ................................................. G09G 5/00
(52) U.S. Cl. ................... 345/163; 345/156; 345/157; 345/158; 345/159; 345/160; 345/161; 345/162
(58) Field of Search ................................. 345/156, 157, 345/158, 159, 160, 161, 162, 163

(56) References Cited

U.S. PATENT DOCUMENTS

| | | | |
|---|---|---|---|
| 4,816,810 A | * | 3/1989 | Moore ......................... 345/163 |
| 4,906,843 A | | 3/1990 | Jones et al. |
| 5,245,320 A | | 9/1993 | Bouton |
| 5,762,306 A | | 6/1998 | Day |
| 5,831,597 A | * | 11/1998 | West et al. .................. 345/163 |

FOREIGN PATENT DOCUMENTS

| | | |
|---|---|---|
| DE | 196 37 487 | 3/1998 |
| DE | 298 04 165 | 5/1998 |
| DE | 196 52 491 | 6/1998 |
| WO | 97/44901 | 11/1997 |
| WO | 98/10344 | 3/1998 |

OTHER PUBLICATIONS

*Nicht Fisch, nicht Fleisch*, BLITZLICHT, pp. 180–181, May 1991.
*Bit Pad Plus*, nbn ELEKTRONIK, Nov. 1998 (2 pages).
*Zeichenbrett für Windows*, PRAXISTEST, OmniPen Digitalisiertablett, p. 81, May 1994.

* cited by examiner

Primary Examiner—Richard Hjerpe
Assistant Examiner—Jean Lesperance
(74) Attorney, Agent, or Firm—Pauley Petersen & Erickson

(57) ABSTRACT

The invention relates to an operator's communication unit (1) comprising a mouse (4) and an annunciator (3) that interacts electrically therewith, and a cable arrangement (2) for connection to the input (5.1') of an operator's communication unit for a computer. The structure of the inventive device is simple and it is easy to handle by virtue of the fact that the mouse (4) is connected via a single mouse cable (2.1) and the annunciator (3) is connected via a single annunciator cable (2.2) to a common connection element (2.9'), whereby the mouse cable (2.1) and the annunciator cable (2.2) can be joined together either directly or via an additional connection element (2.5) or an additional transition cable (2.9) and a connection element to the input (5.1') to the operator's communication unit for a computer (5).

11 Claims, 2 Drawing Sheets

OPERATOR'S COMMUNICATION UNIT WITH A MOUSE FOR A COMPUTER

BACKGROUND OF THE INVENTION

1. Field of the Invention

This invention relates to an operating unit with a mouse and a pad, which is in electrical operative connection with the operating unit, and with a cable arrangement for connection to an operating unit input of a computer.

2. Description of Related Art

Such an operating unit is known from German Patent Reference DE 196 37 487 A1, for example. Here, the mouse, together with a multi-phase electrical traveling wave generated in the pad, creates position signals which are processed by the computer for controlling the indicator and further functions. Such a mouse is particularly suitable for industrial applications, since no mechanically moved elements, for example a roller ball, inside the mouse are required.

In a similar operating unit for a computer as disclosed in German Patent Reference DE 196 52 491 A, a coil is provided in the mouse, as well as in the pad, over which it is guided, and the mouse receives its operating voltage by induction of the electromagnetic traveling wave continuously generated in the pad. Here, too, the movement of the mouse is detected from modulation signals.

An operating unit with a pad and a mouse are disclosed in PCT International Application WO 97/44901 wherein the pad and the mouse are not in an electrically operative connection, but instead the pad has, independently of the mouse input function, an input function with capacitive touch areas, which can be manually operated. In one exemplary embodiment the pad and the mouse are in connection with the computer via a common wireless transmission unit.

SUMMARY OF THE INVENTION

One object of this invention is to provide an operating unit of the type mentioned but which assures high operational dependability and can be connected by a user in a simple manner.

This object is achieved with the characteristics described in the claims and in this specification. The mouse is connected by a single mouse cable, and the pad by a single pad cable, to a common connecting element, wherein the mouse cable and the pad cable are used for conducting electrical signals and at least the pad cable is also used for the voltage supply. The mouse cable and the pad cable together can be connected with the operating unit input of the computer via the common connecting element directly, or via an additional transmission cable and a junction element.

In this way the mouse and the pad can be definitely connected with each other and with the computer, wherein the different cables are definitely connected with each other and assigned to each other, and a safe voltage supply for a dependable function is assured. Thus the attachment of the pad by only a single cable for the voltage supply, as well as for the electrical signals, also favor a simple, dependable seal.

With a sufficiently high supply output, such as with a PS/2 port, for example, the voltage supply can take place from the operating unit input of the computer, so that no additional supply cable needs to be provided. If the operating unit input does not provide a sufficient output for the voltage supply, the supply can take place in a simple way via the additional supply cable from the keyboard input of the computer, which provides sufficient output.

If the mouse cable is divided into two separable sections by a plug/connector unit, the pad is fixedly connected only with the cable and connecting elements, and the connection of the operating unit can be easily completed through the connector for the mouse. In a reverse manner, the removal of the operating unit from the computer can also be simplified.

Sealing of the operating unit is favored because the pad cable is sealingly introduced into the pad housing through a cable duct and is connected in the interior of the pad housing.

A simple connection of the supply cable is achieved because the supply cable is connected with an intermediate piece between the keyboard input of the computer and a connecting element of a connector cable of the keyboard. The intermediate piece has a cable section which has a plug on one of its sides and a connector on the other side, or is embodied as a plug/connector housing unit, in which the connecting point for the supply cable is provided. In this case the keyboard can also be simply connected.

A simple, easy-to-operate arrangement results because only the connecting element, the transmission cable, the junction element, the pad cable and the pad form a unit which is fixedly connected, and alternatively because the connecting element, the section of the mouse cable adjoining it, along with the associated part of the plug/connector unit, the pad cable, the pad, the supply cable and the cable section with the plug and the connector form a unit which is fixedly connected. In this case the user need only make a few connections which can be easily performed.

The construction can be advantageous with a direct connectability with the computer if the connecting element is a trapezoidal bushing or a trapezoidal plug, because the trapezoidal plug in particular offers sufficient space for joining several cables.

BRIEF DESCRIPTION OF THE DRAWINGS

This invention will be explained in greater detail in view of several embodiments, making reference to the drawings wherein.

DESCRIPTION OF PREFERRED EMBODIMENTS

Figure 1:
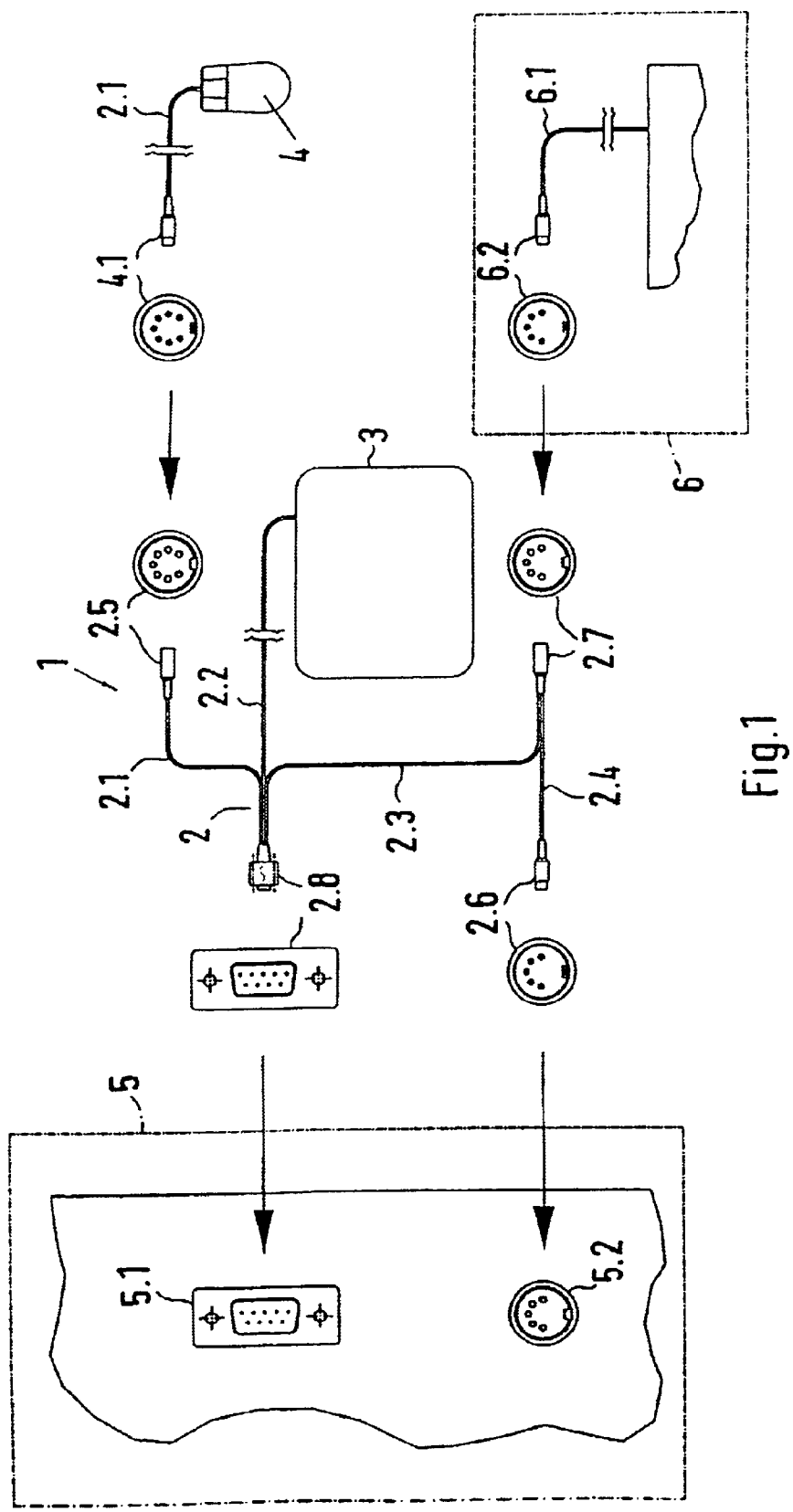
FIG. 1 is an exploded diagrammatic view of an operating unit to be connected to a computer, according to one embodiment of a cable arrangement.

FIG. 1 shows an operating unit 1 with a mouse 4 and a pad 3, which can be connected via a cable arrangement 2 with an operating unit input 5.1 of a computer 5. A multi-phase electrical traveling wave is created in the housing of the pad 3, which is scanned by means of a receiver coil in the mouse when the mouse 4 is moved over the pad 3. The movement of the mouse can be evaluated by processing the electrical signal from the pad 3 and the mouse 4, such as explained in greater detail above in the related art.

A supply cable 2.3, a pad cable 2.2, and a mouse cable 2.1 are brought together and connected in a common connecting element in the form of a trapezoidal-shaped operating unit bushing 2.8. The trapezoidal-shaped operating unit bushing 2.8 can be placed on a correspondingly trapezoidal-shaped plug of the operating unit input 5.1, so that the mouse 4 and the pad 3 are simultaneously connected with the operating unit input 5.1. The supply cable 2.3 is also connected with an intermediate bushing 2.7, to which a cable section 2.4 is also attached, which has a keyboard plug 2.6 on its side facing the computer 5, in order to make a connection with a keyboard input 5.2 of the computer 5. The intermediate bushing 2.7 is used for connecting a keyboard 6 with a connecting cable 6.1 and a connecting plug 6.2. The mouse cable 2.1 is made of two sections, which can be plugged into each other with a mouse bushing 2.5 and a mouse plug 4.1. The pad cable 2.2 is introduced into the pad housing in a sealed manner, and is connected therein with a control board.

The pad 3 can be supplied with the required supply voltage by means of a voltage taken off the keyboard input 5.2 and conducted via the cable section 2.4, the supply cable 2.3 and the pad cable 2.2. In this case the keyboard input 5.2 makes a sufficiently stable voltage available.

In place of the cable section 2.4 with the keyboard plug 2.6 and the intermediate bushing 2.7, a plug/connector housing unit can also be provided which, on its side facing the computer 5, is embodied as a plug, and on its side facing away from the computer 5 as a connector for the connecting plug 6.2 of the keyboard 6, and in addition has a connector for the supply cable 2.3.

Figure 2:
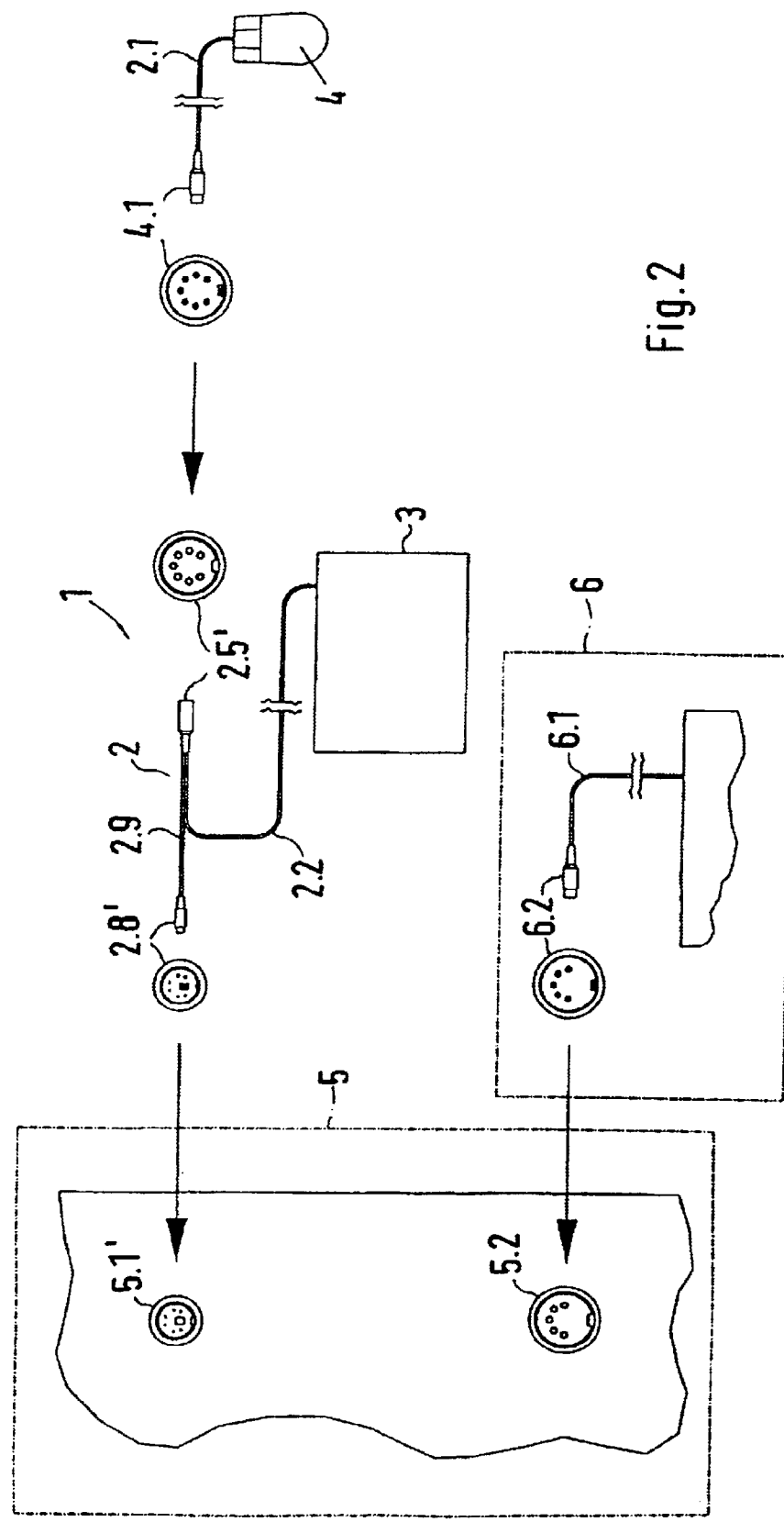
FIG. 2 is an exploded diagrammatic view of an operating unit with another embodiment of the cable arrangement.

While FIG. 1 shows a cable arrangement 2 for a COM port of a computer 5 in particular, a cable arrangement 2 for connection to a PS/2 port of a computer 5 is shown in FIG. 2. In this embodiment the operating unit 1 works correspondingly to the operating unit 1 in the first embodiment. However, the supply voltage is provided from the operating unit input 5.1', which is supplied with a round bushing. A corresponding operating unit plug 2.8' of the cable arrangement 2 can be connected to the round bushing of the operating unit input 5.1'. Because the round bushing of the operating unit input 5.1' and the corresponding operating unit plug 2.8' have relatively small cross-sectional dimensions, the pad cable 2.2 is connected with the mouse bushing 2.5'. A transmission cable 2.9 is provided between the mouse bushing 2.5' and the operating unit plug 2.8', via which the signals from and to the mouse 4, as well as from and to the pad 3, as well as the supply voltage for at least the pad 5, are conducted.

The operating unit 1 with the cable arrangement 2 shown is not only simple in its structure, but also simple to operate, and can also be easily connected to the computer 5 by an untrained user.

What is claimed is:

1. In an operating unit (1) having a mouse (4) and a pad (3), which is in electrical operative connection with the operating unit (1), and with a cable arrangement (2) for connection to an operating unit input (5.1, 5.1') of a computer (5), the improvement comprising:

the mouse (4) is connected by a single mouse cable (2.1) the pad (3) is connected by a single pad cable (2.2) to a common connecting element, wherein the mouse cable (2.1) and the pad cable (2.2) are used for conducting electrical signals and at least the pad cable (2.2) is used for a voltage supply;

the mouse cable (2.1) and the pad cable (2.2) can be connected with the operating unit input (5.1, 5.1') of the computer (5) via the common connecting element one of directly and via an additional transmission cable (2.9) and a junction element (2.8'); and with a connection by the additional transmission cable (2.9) the voltage supply takes place directly from the operating unit input (5.1'), and with a direct connection an additional supply cable (2.3) leading to the common connecting element and connected with a keyboard input (5.2), the mouse cable (2.1) divided into two separable sections by a plug/connector unit, the pad cable (2.2) sealingly introduced into a pad housing through a cable duct and connected in an interior of the pad housing, and the supply cable (2.3) connected with an intermediate piece between the keyboard input (5.2) of the computer (5) and a connecting element (6.2) of a connector cable (6.1) of the keyboard (6), and one of the intermediate piece having a cable section (2.4) which has a plug (2.6) on one side and a connector (2.7) on an other side, and the intermediate piece embodied as a plug/connector housing unit in which the connecting point for the supply cable (2.3) is provided.

2. In the operating unit in accordance with claim 1, wherein only a connecting element (2.5') of the plug/connector unit, the transmission cable (2.9), the junction element (2.8'), the pad cable (2.2) and the pad (3) form a fixedly connected unit.

3. In the operating unit in accordance with claim 1, wherein the common connecting element, a section of the mouse cable (2.1) adjoining the common connecting element, along with an associated part of the plug/connector unit (2.5/4.1), the pad cable (2.2), the pad (3), the supply cable (2.3) and the cable section (2.4) with the plug (2.6) and the connector (2.7) form a fixedly connected unit.

4. In the operating unit in accordance with claim 3, wherein with a direct connectability with the computer (5), the common connecting element is one of a trapezoidal bushing (2.8) and a trapezoidal plug.

5. In an operating unit (1) having a mouse (4) and a pad (3), which is in electrical operative connection with the operating unit (1), and with a cable arrangement (2) for connection to an operating unit input (5.1, 5.1') of a computer (5), the improvement comprising:

the mouse (4) is connected by a single mouse cable (2.1) the pad (3) is connected by a single pad cable (2.2) to a common connecting element, wherein the mouse cable (2.1) and the pad cable (2.2) are used for conducting electrical signals and at least the pad cable (2.2) is used for a voltage supply;

the mouse cable (2.1) and the pad cable (2.2) can be connected with the operating unit input (5.1, 5.1') of the computer (5) via the common connecting element one of directly and via an additional transmission cable (2.9) and a junction element (2.8'); and with a connection by the additional transmission cable (2.9) the voltage supply takes place directly from the operating unit input (5.1'), and with a direct connection an additional supply cable (2.3) leading to the common connecting element and connected with a keyboard input (5.2), wherein only a connecting element (2.5'), the transmission cable (2.9), the junction element (2.8'), the pad cable (2.2) and the pad (3) form a fixedly connected unit.

6. In the operating unit in accordance with claim 5, wherein the mouse cable (2.1) is divided into two separable sections by a plug/connector unit.

7. In the operating unit in accordance with claim 6, wherein the pad cable (2.2) is sealingly introduced into a pad housing through a cable duct and is connected in an interior of the pad housing.

8. In the operating unit in accordance with claim 6, wherein the common connecting element, a section of the mouse cable (2.1) adjoining the common connecting element, along with an associated part of the plug/connector unit, the pad cable (2.2), the pad (3), the supply cable (2.3) and the cable section (2.4) with the plug (2.6) and the connector (2.7) form a fixedly connected unit.

9. In an operating unit (1) having a mouse (4) and a pad (3), which is in electrical operative connection with the operating unit (1), and with a cable arrangement (2) for connection to an operating unit input (5.1, 5.1') of a computer (5), the improvement comprising:

the mouse (4) is connected by a single mouse cable (2.1) the pad (3) is connected by a single pad cable (2.2) to a common connecting element, wherein the mouse cable (2.1) and the pad cable (2.2) are used for conducting electrical signals and at least the pad cable (2.2) is used for a voltage supply;

the mouse cable (2.1) and the pad cable (2.2) can be connected with the operating unit input (5.1, 5.1') of the computer (5) via the common connecting element one of directly and via an additional transmission cable (2.9) and a junction element (2.8'); and with a connection by the additional transmission cable (2.9) the voltage supply takes place directly from the operating unit input (5.1'), and with a direct connection an additional supply cable (2.3) leading to the common connecting element and connected with a keyboard input (5.2), wherein with a direct connectability with the computer (5), the common connecting element is one of a trapezoidal bushing (2.8) and a trapezoidal plug.

10. In the operating unit in accordance with claim 9, wherein the pad cable (2.2) is sealingly introduced into a pad housing through a cable duct and is connected in an interior of the pad housing.

11. In the operating unit in accordance with claim 9, wherein the supply cable (2.3) is connected with an intermediate piece between the keyboard input (5.2) of the computer (5) and a connecting element (6.2) of a connector cable (6.1) of the keyboard (6), and one of the intermediate piece has a cable section (2.4) which has a plug (2.6) on one side and a connector (2.7) on an other side, and the intermediate piece is embodied as a plug/connector housing unit in which the connecting point for the supply cable (2.3) is provided.

* * * * *